United States Patent
Kwong

(10) Patent No.: US 6,214,311 B1
(45) Date of Patent: Apr. 10, 2001

(54) PROCESS FOR DIRECT REDUCTION OF SULFUR COMPOUNDS TO ELEMENTAL SULFUR IN COMBINATION WITH THE CLAUS PROCESS

(76) Inventor: Kam-Wang Vincent Kwong, 100 W. Walnut St., Pasadena, CA (US) 91124

( * ) Notice: Subject to any disclaimer, the term of this patent is extended or adjusted under 35 U.S.C. 154(b) by 0 days.

(21) Appl. No.: 09/157,467

(22) Filed: Sep. 21, 1998

(51) Int. Cl.$^7$ .................................................. C01B 17/02
(52) U.S. Cl. .................. 423/570; 423/574.1; 423/576.2; 423/576.8
(58) Field of Search ................. 423/570, 576.2, 423/574.1, 576.8

(56) References Cited

U.S. PATENT DOCUMENTS

| | | | |
|---|---|---|---|
| 1,741,551 | * 12/1929 | Benner et al. | 423/570 |
| 1,771,481 | * 7/1930 | Benner | 423/570 |
| 1,836,357 | * 12/1931 | Benner et al. | 423/570 |
| 2,090,828 | * 8/1937 | Beckmann | 423/570 |
| 3,755,551 | * 8/1973 | Bridwell et al. | 423/570 |
| 3,848,071 | * 11/1974 | Groenendaal | 423/570 |
| 3,927,191 | * 12/1975 | Archambault | 423/570 |
| 3,931,390 | * 1/1976 | Palilla | 423/244 |
| 4,060,595 | * 11/1977 | Eisenlohr et al. | 423/570 |
| 4,081,519 | * 3/1978 | Whelan | 423/570 |
| 4,988,494 | * 1/1991 | Lagas et al. | 423/576.4 |
| 5,242,673 | * 9/1993 | Flytzani-Stephanopoulos | 423/570 |
| 5,494,879 | * 2/1996 | Jin et al. | 502/314 |

OTHER PUBLICATIONS

Querido et al Removal of Sulfur Dioxide from Stalls Gases by Catalytic Reduction to Elemental Sulfur with Carbon Monoxide, Ind. Eng Chem, Process Des. Delecop vol. 12, No. 1, 19773.*

"Rounding Up Sulfur", Kwong et al, Chem. Engrg., Feb. 1995; p. 73–84.*

* cited by examiner

Primary Examiner—Gary P. Straub

(57) ABSTRACT

The present invention is a process wherein a process gas comprising at least $SO_2$ and $H_2S$ is reacted across a stage of $SO_2$ reducing catalyst, thereby obtaining high conversion of at least the $SO_2$ to elemental sulfur.

5 Claims, 6 Drawing Sheets

PROCESS FOR DIRECT REDUCTION OF SULFUR COMPOUNDS TO ELEMENTAL SULFUR IN COMBINATION WITH THE CLAUS PROCESS

BACKGROUND OF THE INVENTION

The present invention relates to elemental sulfur production by the Claus process.

The most commonly used process for recovering elemental sulfur from sulfur compounds is the modified Claus process. So pervasive is the use of this process, It is difficult to imagine a world in which this process were replaced entirely by some other. It is well known in the art that what may appear to be small stepwise changes to the unskilled will most often have a dramatic impact on the capital or operating costs of production of thousands of tons of sulfur produced worldwide from refining and other operations using the modified Claus process. In addition, even the most egregiously polluting countries who in the past have neglected atmospheric discharge of sulfur compounds are in the process of tightening controls on that discharge, making the impact of improvements in the process even more global and important.

In the modified Claus process, one third of the H2S in an acid gas feed is oxidized thermally with air, enriched air or oxygen to form a certain amount of SO2. The latter then reacts with the remaining H2S to form elemental sulfur according to the Claus reaction, the complete reaction sequence is expressed as:

  (1)

  (2)

However, although practically very difficult in processing waste or acid gases from other process operations, the ratio of H2S:SO2 must be tightly controlled at 2:1 in order to achieve maximum sulfur recovery with the modified Claus process alone. The term "maximum" sulfur recovery is somewhat misleading since maximum sulfur recovery by the modified Claus process is only about 90–98% due to the thermodynamic equilibrium limitations of the Claus reaction as illustrated in reaction (2) above. As a result, the residual sulfur content from a conventional Claus unit is still relatively high and may not meet emission requirements of the processing facility's location. The maximum recovery of elemental sulfur is limited by incomplete conversion of H2S and SO2 to elemental sulfur due to the reduced thermodynamic chemical equilibrium for the Claus reaction under the economically advantageous conditions required for the unit operation, i.e., at atmospheric pressure and in the presence of the several other chemical entities. The 90–98% elemental sulfur recovery also depends heavily on the H2S concentration in the feed gas and the two or three Claus catalytic stages used, among other factors.

To address the problem of the less than desired elemental sulfur conversion and recovery by the modified Claus process, a number of different methods exist to work in combination with the basic modified Claus process to increase that conversion and recovery. The first practiced set of methods used to increase sulfur recovery in combination with the modified Claus process was to further treat and/or recycle the gas issuing from the last Claus catalytic stage, i.e., the tail gas.

One of the tail gas treating processes, which increases the overall sulfur recovery from a conventional Claus unit, is the BSR/Selectox process. In this process, the Claus tail gas is first heated to a desired reaction temperature required in the BSR hydrogenation/hydrolysis catalytic reactor. Typically, a reducing gas generator (RGG) is used to heat the tail gas and provide additional hydrogen by incomplete oxidation of a hydrocarbon feed in the RGG. Sulfur species in the tail gas, such as SO2, COS and CS2, are converted to H2S in a hydrogenation/hydrolysis reactor. After the hydrogenation step, the excess water in this gas is reduced by condensation. The gas is then processed in the Selectox reactor for sulfur recovery. The Selectox catalyst directly catalyzes the oxidation of H2S to SO2 in the presence of oxygen. The Claus reaction for the production of elemental sulfur from H2S and SO2 is also catalyzed by the Selectox catalyst.

Stoichiometric amount of oxygen is added to the Selectox reactor in order to achieve an H2S:SO2 ratio of 2:1 for the Claus reaction. Overall sulfur recovery for Claus units equipped with BSR/Selectox unit can be up to 99 percent.

If even higher sulfur recovery is desired, the Selectox reaction step is removed and the converted-species sulfur in the form of H2S issuing from the hydrogenation/hydrolysis reactor is absorbed in an absorber using an H2S-selective amine process, such as MDEA. The removed H2S is recycled to the Claus thermal stage for enhanced sulfur recovery. This process, known as BSR/MDEA or SCOT, can improve overall sulfur recovery to more than 99.9%. However, the additional capital cost for the BSR type tail gas processes can be more than 50% of a conventional Claus unit because of the additional hydrogenation, water removal and the tail gas cleanup steps.

Another method to increase overall sulfur recovery for a modified Claus process is to use a selective oxidation catalyst stage as the last stage in which elemental sulfur is formed from non-elemental sulfur components in the tail gas. In a catalytic Claus stage, thermodynamic equilibrium limits the conversion of H2S and SO2 to sulfur. However, selective or direct oxidation of H2S to elemental sulfur is essentially complete in a selective oxidation stage and is not so limited. Where SO2 in the feed gas to a selective oxidation stage is sufficiently eliminated so it does not pass unreacted through that stage, a final conversion stage with selective oxidation results in higher overall sulfur recovery compared to a process using only catalytic Claus stages. The selective oxidation reaction is expressed as:

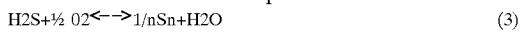  (3)

One of the commercial processes that use the final selective oxidation stage is the SuperClaus process. The SuperClaus process uses an H2S-shifted Claus operation (higher H2S:SO2 ratio than 2:1) in combination with a selective oxidation step. The SuperClaus consists of a thermal stage followed by two or three Claus stages and one final selective oxidation stage. The thermal stage and the Claus catalytic stages are operated under an H2S-shifted Claus operation, either by reducing the combustion air to the main burner of the thermal stage or by-passing a portion of the Claus feed gas around the main burner, in order to minimize the residual SO2 in the gas leaving the last Claus stage since any residual SO2 entering the selective oxidation stage will not be converted to elemental sulfur. Under this mode of operation, the H2S in the gas leaving the last Claus reactor is controlled, instead of controlling the H2S:SO2 ratio to 2:1 in a conventional Claus unit, before it is fed to the last selective oxidation stage in which H2S is oxidized to elemental sulfur. The selective oxidation catalyst employed is substantially insensitive to the presence of water vapor in the process gas and ineffective in promoting the reverse Claus reaction. The overall sulfur recovery for the SuperClaus process can be more than 99%, depending on the feed gas composition and the number of catalytic stages. By eliminating the hydrogenation step and the water removal step, as required by the BSR/Selectox, BSR/MDEA or SCOT process, the additional capital cost for substituting a SuperClaus stage for a 3rd Claus stage is claimed to be 15–20% higher than the Claus unit. However, operating the thermal stage and the Claus stages at higher H2S:SO2 ratio reduces the overall sulfur recovery efficiency of the front-end section of the process which results in a shift of the sulfur recovery load to the final selective oxidation stage. Due to normal plant fluctuations in acid gas feed composition and process conditions, the last catalytic oxidation stage can be subjected to high H2S feed and subsequent temperature excursion, which may require reactor bypass or plant shutdown.

Another process combines BSR hydrogenation of the above described sulfur compounds and the selective oxidation of H2S to elemental sulfur, eliminating the H2S-shifted Claus operation as required in the SuperClaus process. This process, represented in actual operation as the BSR Hi-Activity, and the SuperClaus 99.5 processes, can obtain up to 99.5% overall sulfur recovery. These processes are less expensive than the other types of BSR tail gas cleanup processes, because no water removal step is required. Although the unskilled may view the variety of Claus-combined sulfur conversion processes as easily understood, in fact sulfur plant operation is a very complicated and challenging job. Acid gas feed to a sulfur plant usually includes wide variation in the volume and concentration of sulfur and other compounds, including a substantial amount of ammonia or amine in some plants. Theoretically, control of the thermal stage(s) using air, enriched air or oxygen for conversion of H2S to SO2 has permitted some processes to obtain extremely high recovery of sulfur whether for the 2:1 ratio for H2S to SO2 or for H2S-shifted operation. In actual operation, the several interactions of stream component analysis and measurement of flow, temperature, pressure and other process parameters with the compressors, valves, burners, aging or fouled catalyst beds and other process equipment has made error-free, continuous recovery of sulfur from acid gas an elusive goal. The present invention makes a further improvement in the pursuit of that goal by eliminating or reducing the importance of such careful control of the H2S/SO2 ratio at 2:1 for the conventional Claus plants or H2S-shifted operation for the SuperClaus plants.

SUMMARY OF THE INVENTION

The present invention is a process wherein a process gas at least containing SO2 derived from a thermal stage or a lean stream catalytic stage in combination with the Claus process is directly reduced to elemental sulfur. The present disclosure incorporates by reference U.S. Pat. No. 5,494,879 disclosing that "Preliminary research efforts have been made to allow the conversion of concentrated sulfur dioxide to elemental sulfur." (col. 2, lines 7–9). The goal of the research was directed "to convert sulfur dioxide recovered from smokestack scubbers to elemental sulfur. If this conversion could be accomplished in a commercially feasible fashion, it would facilitate storage and transportation of the waste products." (col. 2., lines 1–5). The work described in the patent obtained slightly more than 90% conversion of SO2 to another form with selectivity of about 99% for elemental sulfur at a space velocity of 10,000 per hr. However, the SO2 concentration was about 33 mole percent of the gas flowing over the disclosed catalyst of Fe, Co, Ni, and Mo compounds. It is an option to use either a mixture of synthesis gas (H2 and CO) or methane with the SO2 for direct reduction on the catalyst, although the gas temperatures are about 380°–480° C. and 700°–820° C. respectively.

Additional investigation was made by the inventors named in U.S. Pat. No. 5,494,879 after disclosure to them of the conception of the present inventor of the use of the catalyst system of that patent for combination with the Claus process. Preliminary experimental data indicate that tail gas treatment will be feasible with the catalyst system of U.S. Pat. No. 5,494,879 to effect the objects of the present invention.

Some preferred embodiments of the invention process comprises the steps, or combinations of such steps, where:

1) a thermal stage for an H2S-rich acid gas feed or catalytic stage (such as a Selectox catalyst stage) for an H2S-lean acid gas feed where H2S is oxidized at least in part to SO2 or where a process gas is obtained with a reactionable amount of SO2 in the presence of a significant amount of H2S;

2) one or more catalytic stages in which the Claus reaction (2 H2S+SO2$\Leftrightarrow$2H20+3/n Sn) produces elemental sulfur;

3) one or more subsequent catalytic stages where SO2 is selectively reduced to elemental sulfur by reaction with H2, CO, or other reducing gases in a catalyst system substantially as described in U.S. Pat. No. 5,494,879 or later modified; and 4) one or more catalytic stages where H2S is selectively oxidized to elemental sulfur by reacting with oxygen, for example in relation to the SuperClaus or BSR Hi-Activity processes.

It is known in the art to generate reducing or synthesis gas (H2 and CO as the components for which maximum reaction is desired) with in-line burners situated in a conduit of the Claus process stream equipment, wherein the process combusts air, enriched air or oxygen with a gaseous hydrocarbon feed or a portion of the feed acid gas, which in turn adds all the combustion heat to the process stream in addition to the reducing gas.

In one preferred embodiment, H2S (hydrogen sulfide) in the acid gas feed is partially oxidized with oxygen in a thermal stage before further conversion in one or more Claus catalytic stages. The H2S:SO2 ratio in the gases reacted in the Claus stage is preferably at 2:1, although the process of the present invention may be practiced with a ratio of higher or lower than 2:1 without significantly affecting the overall sulfur recovery efficiency of the process.

In the thermal stage, reducing gases such as H2 and CO are formed via dissociation reactions under overall sub-stoichiometric combustion, although as described above, may also be formed by location of an in-line burner just upstream of a direct reduction catalyst system according to U.S. Pat. No. 5,494,879. In the thermal stage and the Claus stage(s), elemental sulfur is produced according to the Claus reaction:

$$2H2S+SO2 \Longleftrightarrow 3/nSn+2H20$$

In a first embodiment of the invention, tail gas, containing H2S, SO2, H2 and CO is reacted in a selective catalytic direct reduction stage in which most of the residual SO2 is selectively reduced to elemental sulfur in the presence of significant amount of water vapor according to the following reactions:

$$SO2+2H2 \longrightarrow 1/nSn+2H20 \qquad (4)$$

$$0.875SO2+0.75H2+CO \longrightarrow 0.875/nSn+CO2+0.75H20 \qquad (5)$$

$$2SO2+3H2+CO \longrightarrow 2/nSn+CO2+3H20 \qquad (6)$$

Reducing gases such as CO and H2 can be generated internally at the thermal stage for reaction at the SO2 catalytic reduction stage. If additional reducing gas is required, an in-line burner operating in sub-stoichiometric oxygen can be used for reheating the feed gas to the selective reduction stage, or if appropriate reducing gas is available, it can also be added directly to the process stream.

The gas leaving the selective catalytic direct reduction stage, containing mostly residual H2S, is reacted in a selective catalytic oxidation stage in which most of the residual H2S is selectively oxidized to elemental sulfur in the presence of significant amount of water vapor according to reaction (3) above.

Process air, oxygen enriched air or oxygen is added to the last catalytic stage for the production of elemental sulfur in accordance with the selective oxidation reaction. By combining the conventional Claus thermal and catalytic stages, the selective reduction stage and the selective oxidation stage, an overall sulfur recovery efficiency of over 99.5% can be obtained.

The process according to the invention offers the following advantages:

(1) The increasingly intense preoccupation with H2S:SO2 ratio is virtually eliminated. The front-end section comprises a thermal stage feeding its effluent to the Claus catalytic stages, the effluent preferably having an H2S:SO2 ratio of 2:1 for optimal sulfur recovery efficiency in accordance with the Claus reaction. If the Claus section is operated off-ratio, either lower or higher than the preferred 2:1 ratio for the Claus section, the incremental amounts of either SO2 and H2S can be essentially be converted to elemental sulfur in the subsequent selective reduction stage or the selective oxidation stage. This process feature offers easy and forgiving control as compared to (1) the conventional Claus process which require the control of the H2S:SO2 ratio at 2:1 and (2) the SuperClaus process which must control of the inlet H2S concentration at the selective catalytic oxidation reactor by operating the Claus section at H2S-shifted mode (H2S:SO2 ratio much higher than 2:1).

(2) No hydrogenation reaction is required since the residual SO2 from the last Claus catalytic stage is converted to elemental sulfur in the selective reduction stage. This process feature offers a reduction in capital cost as compared to conventional BSR type tail gas treating processes. The process and equipment modifications associated with providing reducing gas if necessary are thus directed to direct SO2 reduction instead of hydrogenation.

(3) No water removal step is required since both the selective catalytic direct reduction stage and the selective catalytic oxidation step are substantially insensitive to the presence of water vapor in the tail gas. This process feature offers a reduction in capital cost as compared to conventional BSR type tail gas treating processes.

(4) Within the control fluctuations and deviations created under actual operating conditions of the modern sulfur plants, typical operation of the thermal stage in such sulfur plants with the modified Claus process produces more than the necessary stoichiometric amount of reducing gases for the subsequent selective reduction reactions which convert SO2 to elemental sulfur with this first embodiment. Additional reducing gas would rarely be needed.

(5) For the non-H2S-shifted sulfur recovery process, an SO2 catalytic reduction stage as a penultimate conversion stage reduces by 50% or more the inlet concentration of H2S to a final selective oxidation stage as compared to BSR Hi-Activity and the SuperClaus processes, where such comparison is based on the same number of catalytic reactors. This process feature reduces potential temperature excursion problems across the selective catalytic oxidation stage and, subsequently, providing better protection for the direct oxidation catalyst used in that stage as well as reducing reactor/plant downtime.

(6) Based on calculation of the results expected from operation of the direct reduction catalyst system of U.S. Pat. No. 5,494,879 and its currently predicted modified system within the combined Claus process of the first embodiment, a set of three catalytic reactors (a single Claus catalytic stage, a single selective catalytic direct reduction stage, and a single selective catalytic oxidation stage) can obtain more than 99.5% overall sulfur recovery, which is substantially higher than other processes, such as the conventional 3-stage Claus and the 3-stage SuperClaus, at a capital cost similar to the conventional Claus process. The discovery of a method to obtain an incremental percentage increase in sulfur recovery over the prior art is especially significant at these high recovery ranges.

(7) An existing 3-stage Claus plant, with a typical overall recovery of 95–98% of sulfur from the acid gas feed, can be easily modified as a retrofit to a 3-stage plant with the following sequence of stages: catalytic Claus stage, SO2 catalytic reduction stage and H2S catalytic oxidation stage. The modification improves sulfur recovery to more than 99.5% with minimal modifications and cost.

(8) CO emissions to atmosphere from any source is coming under scrutiny by government and other bodies controlling environmental quality. The present invention provides a significant CO reduction in the sulfur recovery train gas passed through the SO2 catalytic reduction stage.

Many plants must recover sulfur from lean sulfur streams (from trace amounts to 30 mole percent) for which it is not suitable to apply a thermal stage due to the difficulty in sustaining stable flames therein. In conjunction with a catalytic first stage using a catalyst such as Selectox, the present invention is also applicable to more completely recover elemental sulfur from lean streams, for both the non-recycle and recycle processes using Selectox or similar catalysts. The recycle process uses a cooled first stage effluent recycled to the inlet of the first stage to control temperature rise across the stage. For acid gas streams with less than about 5 mole percent H2S, no recycle is generally needed.

Another embodiment of the present invention comprises using a complete or partial stage of SO2 reduction catalyst as a method to selectively control the relative amounts of H2S and SO2 in the effluent. It has been found that the SO2 reduction catalyst used for the present invention selectively converts SO2 over H2S to elemental sulfur in an SO2 catalytic reduction stage. Results indicate that selective conversion may be controlled by varying the catalyst bed temperature, such that fairly low conversion of H2S is obtained at higher temperatures (around 340° C.) and relatively high conversion at lower temperatures (around 200° C.) while maintaining a relatively constant conversion of SO2 over that same range.

DETAILED DESCRIPTION OF THE INVENTION

In FIGS. 1a, 1b, 2a and 2b, the thermal stage in a preferable embodiment represents a high efficiency, ammonia eliminating burner and reaction furnace, as are available from the Parsons Corporation (Pasadena, Calif. USA). An acid gas comprising sufficient H2S to sustain a stable flame and a process air stream are reacted and cooled in the thermal stage and pass to a condenser/liquid-vapor separation stage where liquid sulfur (S) is withdrawn. The residual vapor passes to a reheat stage (typically a heat exchanger heated by condensation of 600 psig steam). The reheated vapor passes to a Claus catalytic stage (Claus stage) and to another condenser/liquid-vapor separation stage where liquid sulfur (S) is withdrawn.

Figure 1A:
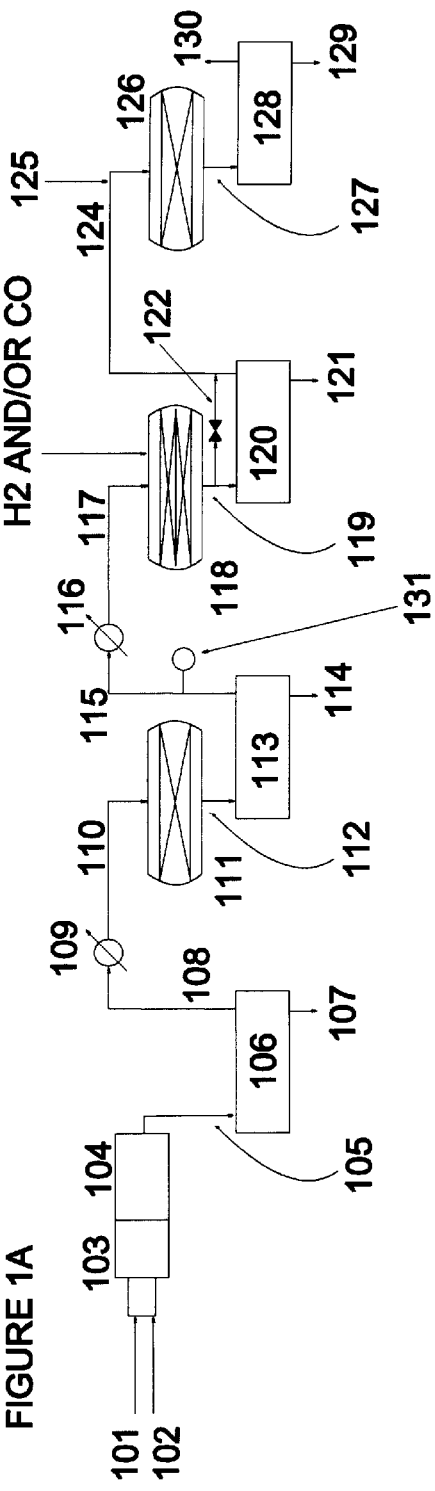
FIG. 1a shows a thermal section represented as the Burner, Reaction Furnace and Waste Heat Boiler. A single Claus catalytic stage, a combined Claus catalytic and selective reduction stage and a selective oxidation stage with condensers are shown with a hot gas bypass for obtaining a desired inlet temperature for the selective oxidation stage.
Figure 1B:
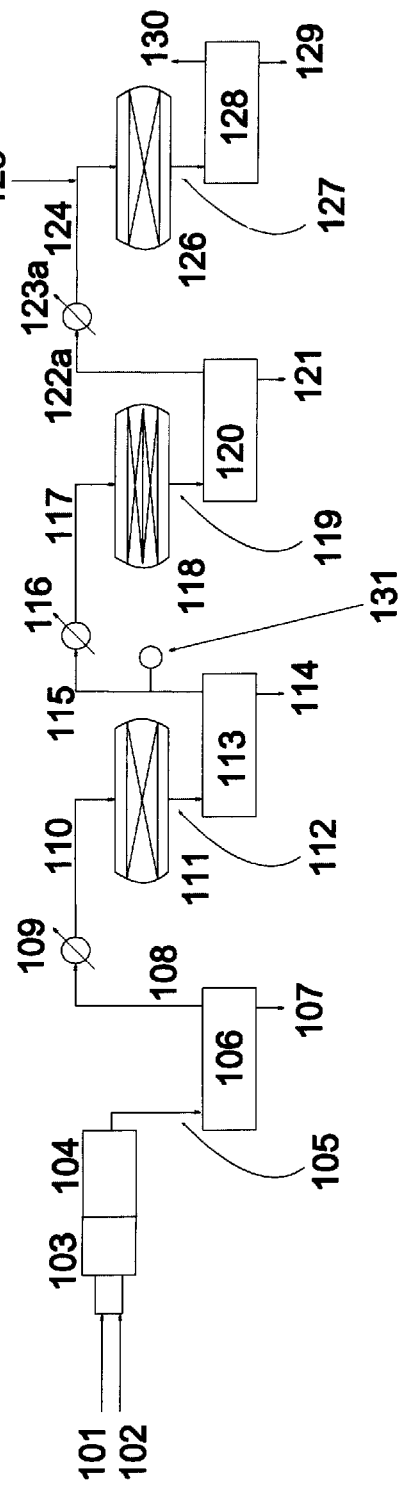
FIG. 1b shows substantially the process of FIG. 1a, except that a reheat step replaces the hot gas bypass for obtaining a desired inlet temperature for the selective oxidation stage.

In FIGS. 1a and 1b, the residual vapor from the condenser of the first Claus stage is reacted (after reheating) in a combined Claus/selective reduction or single selective reduction stage. Catalysts for this second stage comprise an SO2 reduction catalyst alone or in combination with a Claus catalyst. The residual vapor of the reaction products of this stage, after passing through condensation/liquid-vapor separation stage where liquid sulfur is withdrawn, is further reacted in a selective oxidation stage after obtaining a desired residual vapor temperature by hot gas bypass or by reheating.

Figure 2A:
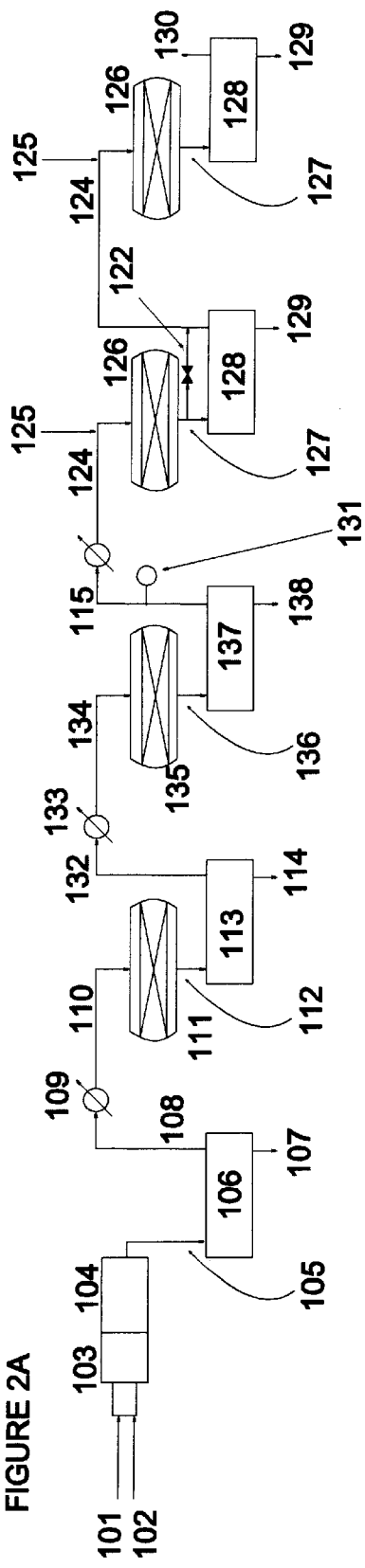
FIG. 2a shows a thermal section represented as the Burner, Reaction Furnace and Waste Heat Boiler. Two separate Claus catalytic stages, a selective reduction stage and a selective oxidation stage with condensers are shown with a hot gas bypass for obtaining a desired inlet temperature for the selective oxidation stage.
Figure 2B:
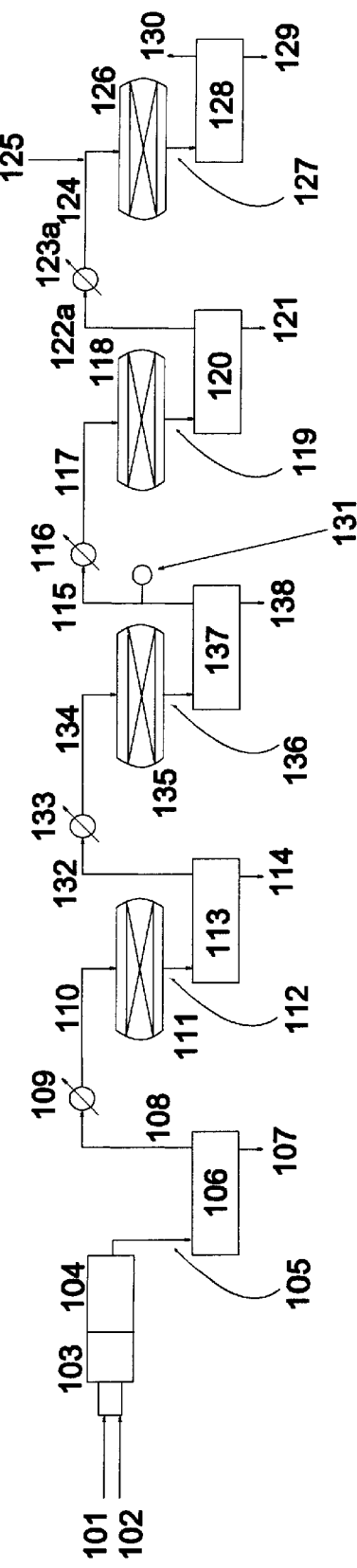
FIG. 2b shows substantially the process of FIG. 2a, except that a reheat step replaces the hot gas bypass for obtaining a desired inlet temperature for the selective oxidation stage.

In FIGS. 2a and 2b, the residual vapor from the condenser of the first Claus stage is reacted (after reheating) in a second Claus stage. The residual vapor of the reaction products of this stage, after passing through condensation/liquid-vapor separation stage where liquid sulfur is withdrawn, is further reacted in a direct reduction stage after reheating to a desired residual vapor temperature. The residual vapor of the reaction products of this stage, after passing through condensation/liquid-vapor separation stage here liquid sulfur is withdrawn, is further reacted in a selective oxidation stage after obtaining a desired residual vapor temperature by hot gas bypass or by reheating.

It will be appreciated that no recycle of sulfur or H2S-shifted process is needed to obtain a very high overall sulfur recovery with the embodiments shown in the Figures. Sulfur compounds or elemental sulfur remaining uncondensed in the residual vapor from the final condenser/liquid-vapor separation stage, shown in the Figures just upstream of an incinerator, are oxidized in that incinerator to SO2 prior to emission from a stack.

The condensers shown in the Figures are typically cooled with generation of 60 psig steam. The process flows, compositions and conditions may be found in the references available to the skilled person, but may optionally be obtained by reference to U.S. Pat. No. 4,988,494, which is incorporated by reference herein. More information on the referenced technologies in this application may be found with reference to the attached brochure "Parsons Sulfur Technology—Providing Unique Solutions" (Parsons Process Group, Inc., 1997) and through contact with the Parsons Corporation thereby.

The process of U.S. Pat. No. 4,988,494 requires a much higher H2S/SO2 ratio to obtain its disclosed higher overall sulfur recovery. It is an unexpected benefit over the prior art to obtain such high sulfur recovery disclosed herein without such dependence on specific H2S/SO2 ratios.

The above benefits have been more specifically proven in lab scale tests as follows.

The catalyst of U.S. Pat. No. 5,484,879 has demonstrated a surprisingly increased efficiency over that described in the patent in converting SO2 from the tail gas of 1st stage as well as 2nd stage Claus reactors, to elemental sulfur by reacting with SO2. A substantial fraction of H2S in the tail gas can also be simultaneously converted to elemental sulfur. At a space velocity of 1000 h-1, the SO2 conversion efficiency to elemental sulfur, using the 1st stage tail gas, reaches 95.9% (200° C.), 93.3% (220° C.), 92.4% (240° C.), 91.8% (260° C.), 89.5% (280° C.), 93.4% (300° C.) and 95.6% (320° C.), H2S conversion reaches 74.3%, 71.1%, 61.6%, 52.7%, 42.6%, 26.8%, and 9.8% at the same respective temperatures. Another catalyst for these specific examples were tested with very similar results, reaching 93.3% (200° C.), 92.2% (220° C.), 92.4% (240° C.), 90.3% (260° C.), 91.2% (280° C.), 90.6% (300° C.), and 92.7% (320° C.) for SO2 conversion, while obtaining 65.2%, 58.8%, 53.3%, 43.0%, 33.3%, 22.5%, and 19.9%, at the respective temperatures, for H2S conversion. The aspect of the present invention comprising H2S conversion has been heretofore unknown. The H2S conversion reaction is believed to be due to concurrent Claus reactions in the same stage as SO2 reduction reactions.

The catalysts below have been evaluated for application in the present invention.

TABLE 1

| | Catalyst compositions | | | | | | |
|---|---|---|---|---|---|---|---|
| Catalyst | % Fe2O3 | % NiO | % Co3O4 | % MnO2 | % MoO3 | % Al2O3 | Form |
| U5104 | 7.0 | 3.2 | 3.2 | 3.8 | 3.0 | 80.1 | 3.2 mm Tablets |
| 1443-55 | 7.6 | 3.4 | 3.3 | 3.8 | 3.5 | 78.1 | ⅛ Tablets |

Experimental Procedure and Results for Catalyst Tests

Experiments were carried out between 200° C. and 340° C. at 20 degree intervals. The space velocity was adjusted at 1000 h-1. A gas mixture simulating the gas composition of 2nd and 1st stage Claus reactors was prepared. The 2nd stage tail gas comprised of 0.32% SO2+0.65% H2S+35% H2O+1.7% H2+0.08% CO, while the 1st stage tail gas consists of 0.92% SO2+1.84% H2S+33% H2O+1.7% H2+0.08% CO.

The experimental setup was made up of three separate sections: the gas supply section, the main reactor, and the detection and analysis section. Gases were supplied from compressed gas cylinders to flow meters before entering a gas mixer. An appropriate amount of water was continuously injected (using a Cole-Parmer syringe pump) into the gas mixture at a hot zone before the catalytic reactor. The tubular reactor is fabricated from a 2.7 cm OD with a 1-mm wall thickness quartz tube. The entire reactor was mounted inside a tubular furnace. The reactor, which was 7 cm long, consisted of three zones. The inlet or the preheating zone (3 cm long) was packed with 20 mesh quartz chips, the reaction zone (3 cm long) was packed with catalysts, and the outlet zone (1 cm long) was packed with quartz chips (20 mesh), mainly for the purpose of supporting the catalyst which sits on a perforated quartz plate having seven holes for gas to exit. A thermocouple, reaching the center of the catalytic reactor, provided measurement of the temperature of catalytic reactions.

After the last section of the reactor, the gases passed several treatment steps to collect elemental sulfur and water. These treatment steps include a trap containing concentrated sulfuric acid solution, a glass filled with silica gel (8 mesh, impregnated with P2O5), and two sinter glass filters. After removal of sulfur and water, the gases then enter a six-port sampling valve which is used to inject the products of the catalytic reactions into the gas chromatograph. Finally, the exit gases passed into a scrubber containing concentrated NaOH.

The inlet and exit gases were analyzed by using a gas chromatograph equipped with a column switching valve and a thermal conductivity detector. A 2-meter Porapak QS (80–100 mesh) column was employed for the analysis of H2S, H20, COS, and SO2. Another column with 2-meter 13× molecular sieves (60–80 mesh) was used for analysis of H2, O2, and CO. The operating conditions were at 60 mA for both columns, and a column temperature of 100° C. for the Porapak QS and room temperature for the 13× molecular sieves. The carrier gas was helium.

The conversion efficiency of SO2 and H2S, the yield of the byproducts, and the selectivity of elemental sulfur were evaluated. The conversion efficiency (%) Of SO2 (CSO2) and H2S (CH2S) was calculated by:

CSO2=100(FiSO2−FOSO2)/FiSO2

CH2S=100(FiH2S−FOH2S)/FiH2S where, FiSO2 and FiH2S are the flow rate (ml/h) of input SO2 and H2S, and FOSO2 and FOH2S are the flow rate of output SO2 and H2S, respectively.

The yield (%) of hydrogen sulfide (YH2S), carbonyl sulfide (YCOS), and elemental sulfur (YS2) is respectively calculated by:

YH2S=100(FOH2S−FiH2S)/FiSO2, if (FOH2S−FiH2S)>0,

YH2S=0, if (FOH2S−FiH2S)<0

YCOS=100FOCOS/FiSO2, and

YS2=CSO2+CH2S−YH2S−YCOS where FOCOS is the flow rate (ml/h) of COS output.

The selectivity (%) of elemental sulfur (SS2) is calculated by:

SS2=YS2/(YS2+YH2S+YCOS)

The space velocity (S.V.) is defined as:

S.V.=FTotal/Wcat(ml/gh-1)

while, FTotal is the sum of the flow rates (ml/h) of all input gases, i.e, FTotal=FiSO2+FiCO+FH2, and Wcat is the weight (g) of the catalyst.

Figure 3:
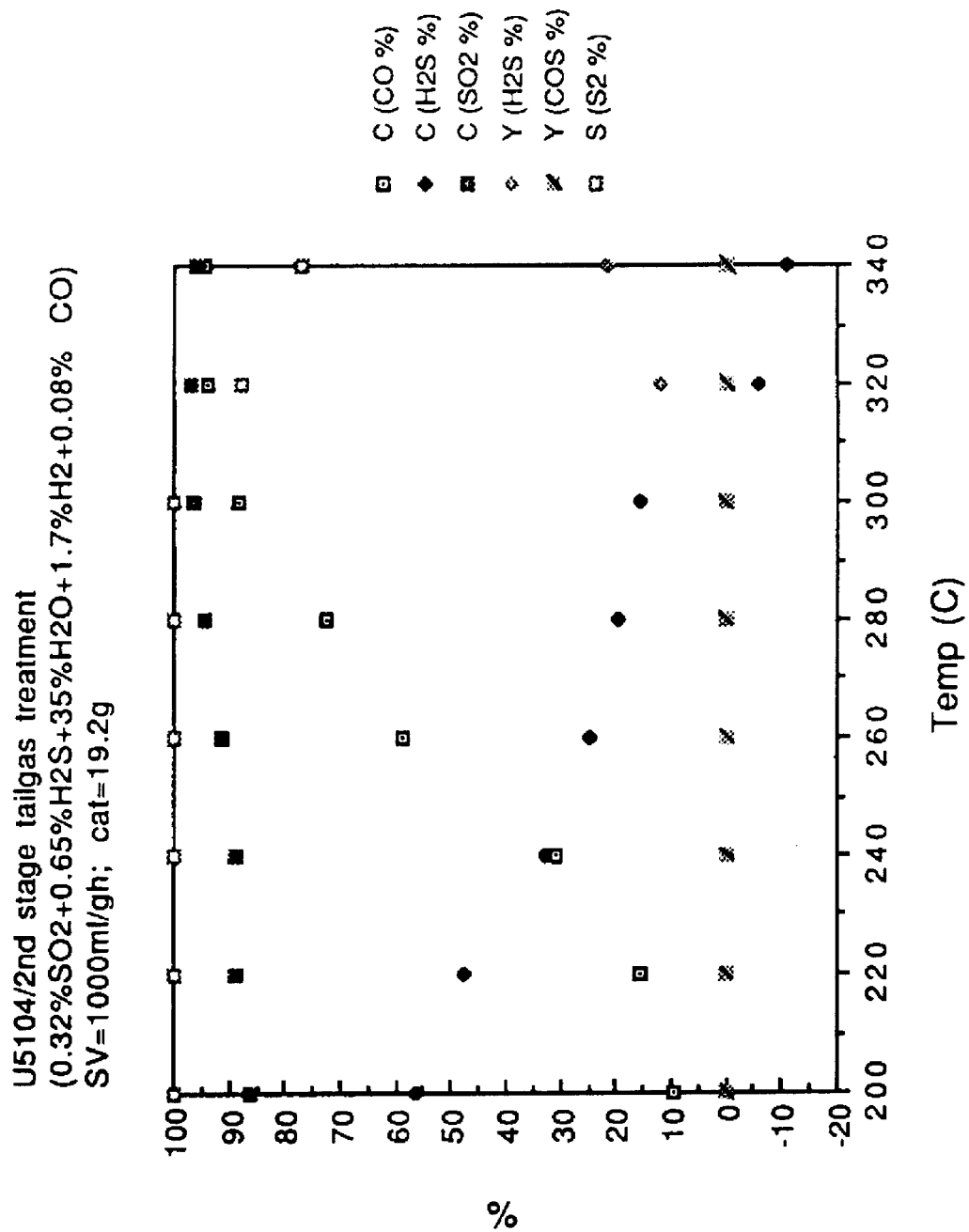
FIGS. 3–5 are experimental results of application of first and second Claus stage tail gases to the SO2 reduction catalyst of the present invention.
Figure 4:
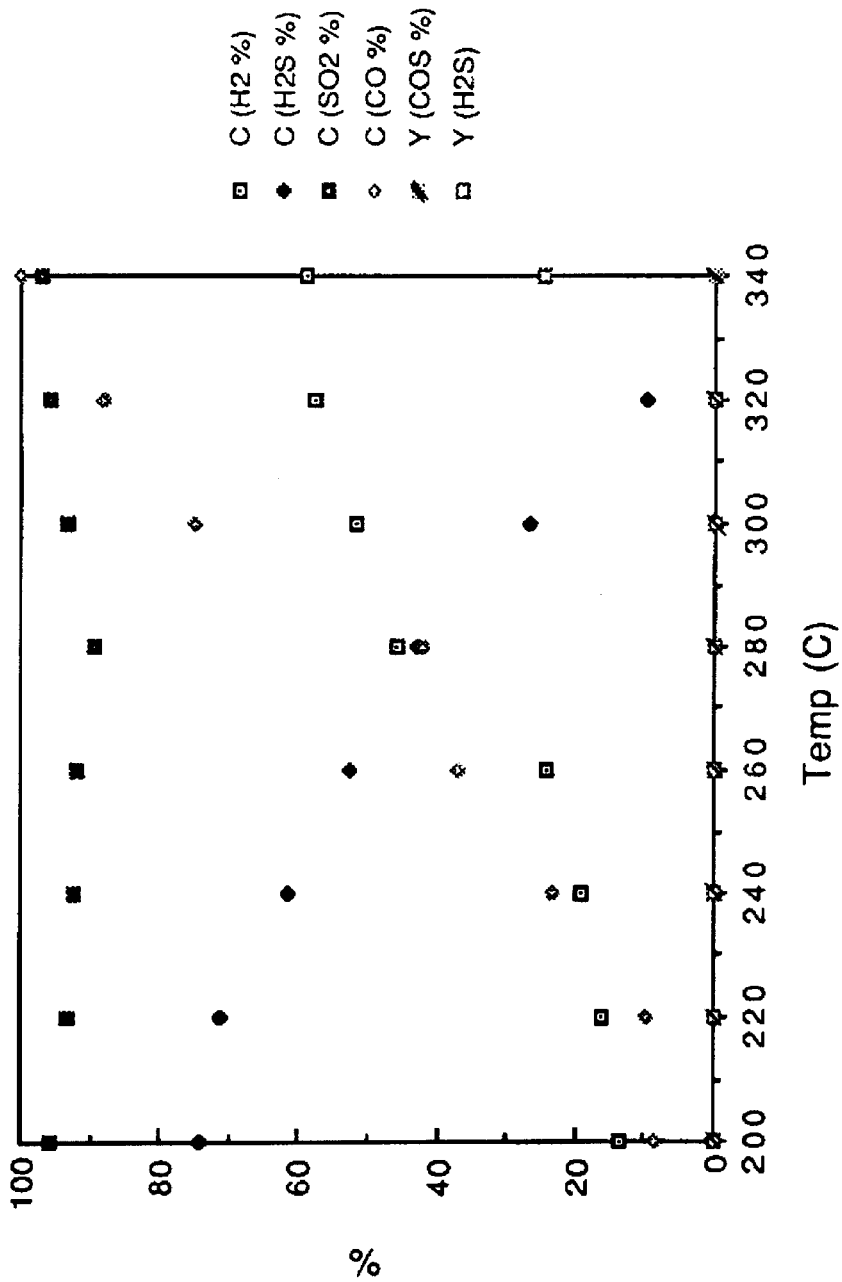

FIG. 3 and Table 2 show the results of the temperature dependence study for the 2nd stage Claus tail gas. The experiments were carried out between 200° C. and 340° C. and at a space velocity of 1000 h-1 with 19.2 g of the catalyst. The conversion Of SO2 increases with an increase in temperature, the CSO2 was 86.2% (200° C.), 88.7% (220° C.), 88.8% (240° C.), 91.5% (260° C.), 94.3% (280° C.), 96.3% (300° C.), 96.8% (320° C.), and 96.0% (340° C.). On the contrary, the conversion of H2S decreases with an increase in temperature, which is consistent with and proof of Claus reaction equilibrium in these temperature ranges, the CH2S was 56.2% (200° C.), 47.5% (220° C.), 32.8% (240° C.), 24.6% (260° C.), 19.5% (280° C.), 15.7% (300° C.), −5.9% (320° C.), and −11% (340° C.). However, at temperatures above 320° C, a fraction of SO2 is converted to H2S: 11.8% and 21.9% at 320° C. and 340° C., respectively. The YCOS is undetectable under the experimental conditions employed. The selectivity of sulfur (SS2) is 100% at temperatures below 300° C., and decreases to 87.8% and 77.2% at 320° C. and 340° C., respectively. FIG. 4 and Table 3 show the results of the temperature dependence study for 1st stage Claus tail gas. The experiments were carried out between 200° C. and 340° C. and at a space velocity of 1000 h-1 with 13.3 g of the catalyst. The conversion of SO2 shows a small preliminary decrease as temperature rises from 200° C. to 280° C. and a subsequent increase as temperature continues to rise, the CSO2 was 95.9% (200° C.), 93.3% (220° C.), 92.4% (240° C.), 91.8% (260° C.), 89.5% (280° C.), 93.4% (300° C.), 95.6% (320° C.), and 97.2% (340° C.). The conversion of H2S decreases with an increase in temperature, the CH2S was 74.3% (200° C.), 71.1% (220° C.), 61.6% (240° C.), 52.7% (260° C.), 42.6% (280° C.), 26.8% (300° C.), and 9.82% (320° C.). At 340° C., 12.2% Of SO2 was converted to H2S. The YCOS is undetectable under the experimental conditions employed.

Figure 5:
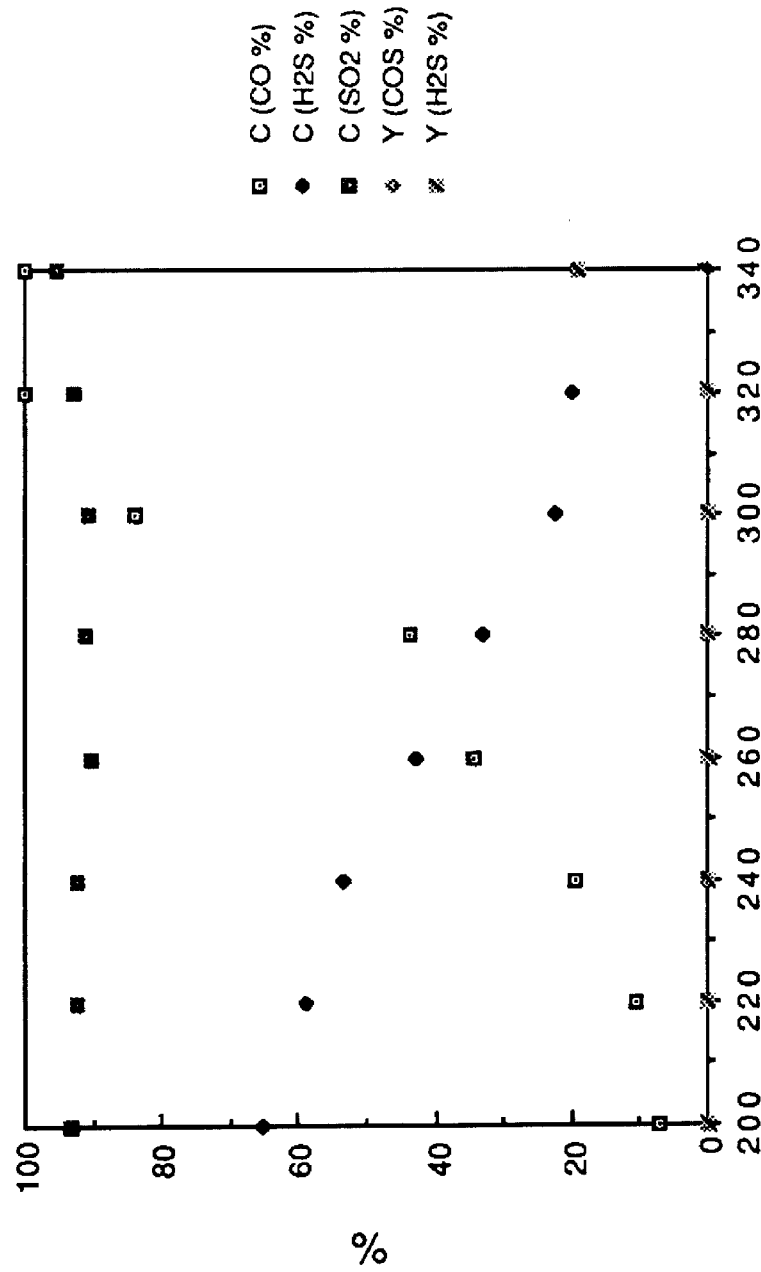

Catalyst 1443-55 was prepared to approximate the catalyst of U.S. Pat. No. 5,494,879 in formulation, support, and preparation methods for 1st stage Claus tail gas. FIG. 5 and Table 4 show the results of evaluation between 200° C. and 340° C. and at a space velocity of 1000 h-1 with 13 g of the catalyst. The conversion of SO2 shows a small decrease as temperature rises from 200° C. to 260° C. then a plateau between 260° C. and 300° C., and a subsequent increase as temperature exceeds 300° C., the CSO2 was 93.3% (200° C.), 92.2% (220° C.), 92.4% (240° C.), 90.3% (260° C.), 91.2% (280° C.), 90.6% (300° C.), 92.7% (320° C.), and 95.5% (340° C.). The conversion of H2S decreases with increased temperatures, the CH2S was 65.2% (200° C.), 58.8% (220° C.), 53.3% (240° C.), 43% (260° C.), 33.2% (280° C.), 22.5% (300° C.), and 19.9% (320° C.). At 340° C., 19.1% of the SO2 was converted to H2S. The YCOS is undetectable under the experimental conditions employed.

TABLE 2

U5104 Catalyst for 2nd stage Claus tail gas

| | Temp (C.) | C (CO %) | C (H2S %) | C (SO2 %) | Y (H2S %) | Y (COS %) | S(S2 %) |
|---|---|---|---|---|---|---|---|
| 1 | 340.000 | 94.500 | −11.000 | 96.000 | 21.900 | 0.000 | 77.200 |
| 2 | 320.000 | 93.900 | −5.900 | 96.800 | 11.800 | 0.000 | 87.800 |
| 3 | 300.000 | 88.400 | 15.700 | 96.300 | 0.000 | 0.000 | 100.000 |
| 4 | 280.000 | 72.400 | 19.500 | 94.300 | 0.000 | 0.000 | 100.000 |
| 5 | 260.000 | 58.700 | 24.600 | 91.500 | 0.000 | 0.000 | 100.000 |
| 6 | 240.000 | 30.800 | 32.800 | 88.800 | 0.000 | 0.000 | 100.000 |
| 7 | 220.000 | 15.700 | 47.500 | 88.700 | 0.000 | 0.000 | 100.000 |
| 8 | 200.000 | 9.270 | 56.200 | 86.200 | 0.000 | 0.000 | 100.000 |

TABLE 3

U5104 Catalyst for 1st stage Claus tail gas

| | Temp (C.) | C (H2 %) | C (CO2 %) | C (H2S %) | C (SO2 %) | C(CO %) | Y (COS %) | Y (H2S) |
|---|---|---|---|---|---|---|---|---|
| 1 | 340.000 | 59.100 | 100.00 | −12.200 | 97.200 | 100.000 | 0.000 | 24.400 |
| 2 | 320.000 | 57.700 | 88.10 | 9.820 | 95.600 | 88.100 | 0.000 | 0.000 |
| 3 | 300.000 | 51.600 | 74.90 | 26.800 | 93.400 | 74.900 | 0.000 | 0.000 |
| 4 | 280.000 | 45.900 | 41.90 | 42.600 | 89.500 | 41.900 | 0.000 | 0.000 |
| 5 | 260.000 | 24.100 | 36.90 | 52.700 | 91.800 | 36.900 | 0.000 | 0.000 |
| 6 | 240.000 | 19.200 | 23.30 | 61.600 | 92.400 | 23.300 | 0.000 | 0.000 |
| 7 | 220.000 | 15.900 | 9.80 | 71.100 | 93.300 | 9.800 | 0.000 | 0.000 |
| 8 | 200.000 | 13.500 | 8.60 | 74.300 | 95.900 | 8.600 | 0.000 | 0.000 |

TABLE 4

1443-55 Catalyst for 1st stage Claus tailgas

| | Temp (C.) | C (CO %) | C (H2S %) | C (SO2 %) | Y (COS %) | Y (H2S %) |
|---|---|---|---|---|---|---|
| 1 | 340.000 | 100.000 | −9.550 | 95.500 | 0.000 | 19.100 |
| 2 | 320.000 | 100.000 | 19.900 | 92.700 | 0.000 | 0.000 |
| 3 | 300.000 | 83.700 | 22.500 | 90.600 | 0.000 | 0.000 |
| 4 | 280.000 | 43.800 | 33.200 | 91.200 | 0.000 | 0.000 |
| 5 | 260.000 | 34.500 | 43.000 | 90.300 | 0.000 | 0.000 |
| 6 | 240.000 | 19.700 | 53.300 | 92.400 | 0.000 | 0.000 |
| 7 | 220.000 | 10.400 | 58.800 | 92.200 | 0.000 | 0.000 |
| 8 | 200.000 | 7.030 | 65.200 | 93.300 | 0.000 | 0.000 |

Example According to the Process shown in FIG. 1*b*

As shown in FIG. 1*b*, the following example represents an application of the reduction castalyst of the present invention to a Claus reactor train wherein a first Claus catalytic stage is followed by a first condenser and the reheated effluent from the first condenser is first subjected to either a preliminary Claus catalytic stage followed immediately by a reduction catalyst stage or a single reduction catalyst stage performs the net reaction of the preceding combination.

Streams 101 (an acid gas stream with 90 mole percent H2S and about seven percent H2O) and 102 (an air stream) are at a molar ratio of about 1:2 acid gas to air are combusted in a reaction furnace and cooled in a waste heat boiler and condenser to achieve about a 68 percent conversion of H2S to elemental sulfur, the remaining 32 percent of non-elemental sulfur comprising about a 2:1 molar ration of H2S to SO2. A gas stream is separated from the condensed sulfur in the first condenser, and is reheated to form stream 110 to feed a first catalytic Claus stage, where about 74 mole percent of the remaining H2S and SO2 are reacted to form elemental sulfur, which is recovered in a second condenser.

The gas stream from the second condenser is reheated and the stream 117 fed to a second catalytic stage, comprising a preliminary Claus catalytic stage followed immediately by an SO2 reduction catalyst stage or a single reduction catalyst stage performing the net reaction of the combination of a preliminary Claus catalytic stage followed by a reduction catalyst stage. The conversion of H2S to elemental sulfur overall across this stage is about 71 percent. The conversion of SO2 to elemental sulfur across this stage is about 91 percent. The overall conversion of H2S and SO2 to elemental sulfur across this stage is about 78 percent, with an inlet concentration of H2S and SO2 at about 2 mole percent and 1 mole percent respectively, a stage inlet temperature of about 200° C. and an effluent temperature of about 234° C. Sufficient H2 and CO is formed in the reaction furnace and passed unreacted to this stage to accomplish the objects of the invention, although in the present example, it is predicted that the H2 and CO will be available at about 1.7 mole percent and 0.3 mole percent respectively in the process gas at the inlet of this stage. The effluent concentration of SO2 from this stage after removal of condensed sulfur is about 0.1 mole percent.

The effluent from the SO2 reduction catalyst stage is cooled in a third condenser, separated from condensed sulfur, reheated and fed to a direct or selective oxidation stage with sufficient air to achieve H2S conversion such that H2S in the tail gas is sufficiently low for further thermal or catalytic combustion and release to the atmosphere. The conversion of only H2S to elemental sulfur is about 90 percent, resulting in a stream after condensation and removal of elemental sulfur of about 0.05 mole percent H2S and 0.08 mole percent SO2.

It will be readily appreciated that the reduction catalyst stage, either singly or in combination with a preliminary Claus catalytic stage, improves sulfur recovery over that of a typical commercial Claus catalytic stage train by introducing to the process conversion of SO2 to sulfur without the necessity of the presence of a ratio-specific amount of H2S.

With respect to FIGS. 1A and 1B, acid gas 101 and air 102 are fed to a reaction furnace 103, the effluent of which is cooled in waste heat boiler 104. Stream 105 is the cooled effluent of WHB 104 and is condensed in first condenser 106, which results in condensed sulfur stream 107 and gas stream 108. Stream 109 is reheated in reheater 109. As used herein, a reheater may comprise an indirect or direct (such as an in-line stoichiometric or sub-stoichiometric burner) heating means for the inlet stream.

Reheated stream 110 enters the first catalytic Claus stage 111 and the effluent stream 112 is condensed in second condenser 113 to produce a liquid sulfur stream 114 and gas stream 115. It is preferable that analyzer 131 detect H2S and SO2 in stream 115 for control of air or oxygen enriched gas flow to furnace 103. Stream 115 is reheated in reheater 116 to form stream 117 which is fed to stage 118.

The unique nature of the present invention SO2 reduction catalyst having a proven Claus reaction capability heretofore unknown in the art permits the operation of stage 118 as either a single stage of SO2 reduction catalyst or with a preliminary Claus catalytic stage followed immediately by a stage of the SO2 reduction catalyst. The combination of a stage of Claus catalyst followed immediately by a stage of SO2 reduction catalyst is unknown in the art.

As shown in FIG. 1, CO and/or H2, or a combination of the two gases, may optionally be formed from an external stream and introduced to stage 118 with stream 117. The necessary H2 and/or CO may be in part formed at the reaction furnace by some modes of operation or by operation of a sub stoichiometric inline burner at reheater 116. In any of these cases, a selectivity of SO2 reduction may be effectively controlled by the introduction of various relative amounts of H2 and/or CO in relationship to the amount of SO2 in the stream. The high conversion of SO2 to elemental sulfur with the present invention therefore yields tight control of SO2 in an effluent stream from an SO2 reduction catalyst stage merely by controlling the relative and absolute amounts of CO and H2 entering that stage with the SO2. The experimental results indicate that the relative amounts of CO and H2, in addition to reaction temperature, are important to ultimate conversion yield of elemental sulfur from SO2 by reduction in the SO2 reduction catalyst stage.

The effluent stream 119 of stage 118 is either fed completely to condenser 120, as in FIGS. 1B and 2B, or is split for hot bypass control stream 122. In FIGS. 1B and 2B, stream 122a is reheated in reheater 123a to form stream 124. In FIGS. 1A and 2A, bypass stream 122 combines with the gas effluent stream from condenser 120 to form stream 124. Stream 124 is combined with air stream 125 for reaction in selective oxidation stage 126, wherein substantially all the H2S is converted to elemental sulfur and the effluent stream 127 is condensed in condenser 128 to form gas stream 130, which, after a thermal or catalytic combustion is to be released to the atmosphere in many plant locations. Streams 121 and 129 are condensed sulfur streams.

FIGS. 2A and 2B are embodiments of the present invention with four catalytic stages in the sulfur recovery train. A second catalytic Claus stage is intended for stage 135, that stage receiving stream 134, the gas effluent stream 132 of condenser 113 reheated in reheater 133. The effluent stream 136 enters condenser 137 to form a sulfur condensate stream 138 and gas stream 115. The stream and item numbers of the Figures have substantially the same identity in functionality between the Figures.

Figure 6:
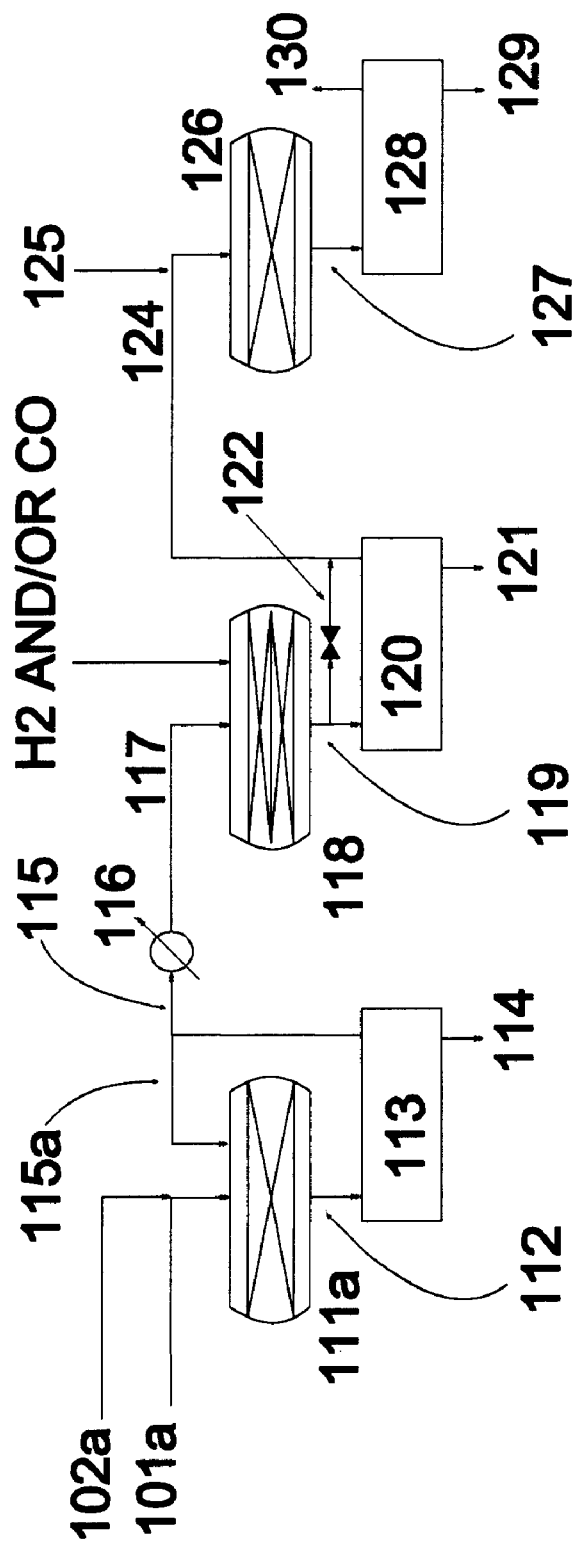
FIG. 6 is an application of the present invention for a lean-H2S stream.

In an alternate embodiment of the present invention for lean sulfur streams (from a trace amount to 30 mole percent), heated acid gas stream 101a and heated air stream 102a are fed, with an optional recycle stream 115a, to a stage with catalytic oxidation of H2S to SO2 with the Claus reaction in a single stage (as in the Selectox® catalyst of UOP). The effluent stream 112 is condensed in condenser 113. The gas stream from condenser 113 may optionally be split to form streams 115a, a recycle stream, and stream 115, which requires an additional source of gas comprising H2 and/or CO, is fed to a stage 118 and further processed as described above. With sulfur recovery at about 80 percent across the stage 111a, stage 118 of FIG. 6 receives an amount of SO2 similar to the stage 118 shown in FIGS. 1A and 2A. The ultimate recovery of sulfur is substantially higher than for prior art lean stream trains with the similar numbers of catalytic stages.

It will be readily appreciated that the reduction catalyst stage, either singly or in combination with a preliminary Claus catalytic stage, improves sulfur recovery over that of a typical commercial Claus catalytic stage train by introducing to the process conversion of SO2 to sulfur without the necessity of the presence of a ratio-specific amount of H2S.

Although the above experimental results above for the SO2 reduction catalysts show high SO2 conversion at 200° C., SO2 conversion is predictably also generally high when inlet temperature and/or catalyst bed temperature is substantially lower than 200° C., even as low as 180° C. This temperature (180° C.) is an important design temperature which usually controls the lowest temperature to which the inlet gas should be preheated or at which the catalyst bed should operate, since significant condensation of sulfur may occur on the catalyst or other reactor surfaces, potentially causing plugging and/or reduced catalyst activity.

The above design disclosures present the skilled person with considerable and wide ranges from which to choose appropriate obvious modifications for the above examples. However, the objects of the present invention will still be obtained by the skilled person applying such design disclosures in an appropriate manner.

I claim:

1. A process for sulfur recovery from a Claus tail gas containing at least SO2, H2S, water and amounts of H2 or CO, or a combination thereof, the combination of CO and/or H2 being stoichiometrically sufficient for the reduction of SO2 to elemental sulfur comprising:

(a) reacting said tail gas in an SO2 catalytic reduction stage by passing the tail gas over an SO2 reduction catalyst at a temperature from below 320 degrees C. to convert at least 85 percent of the SO2 and at least 15 percent of the H2S to elemental sulfur, the SO2 reduction catalyst comprising iron oxide, Co or Nickel oxide either separately or as a mixture, a component selected from the group consisting of the oxides of Mo, Mn, Se, Cu, Zn, and Cr, or combination thereof, and a carrier, the composition of the SO2 reduction catalyst catalyst being represented by the formula:

$Fe_aCo_bNi_cCr_dMo_eMn_fSe_gCu_hZn_iO_x$ wherein a,b,c,d,e, and f are independently ranged between 0 and 30, g and h are between 0 and 10, i is between 0 and 5, and x is determined by the charge balance of the SO2 reduction catalyst, said SO2 reduction catalyst be capable of conversion of the tail gas by SO2 reduction to elemental sulfur substantially in excess of that resulting from the Claus reaction.

2. The process of claim 1 wherein elemental sulfur from the effluent of the SO2 catalytic reduction stage is partly condensed and a gas effluent from the condensation comprises about 1.5 mole percent H2S.

3. The process of claim 2 wherein the gas effluent is combined with a stoichiometrically sufficient amount of oxygen to react the H2S to elemental sulfur and reacted in a catalytic direct oxidation stage.

4. The process of claim 3 wherein the effluent from the catalytic direct oxidation stage comprises less than about 0.2 mole percent H2S.

5. The process of claim 1 wherein the temperature of the SO2 reduction catalyst is maintained at least about above 200° C.

* * * * *